United States Patent [19]

McWilliams

[11] Patent Number: 5,255,501
[45] Date of Patent: Oct. 26, 1993

[54] BALER FOR FORMING CYLINDRICAL BALES

[76] Inventor: Alexander McWilliams, Box 168, Pilot Mound Manitoba, Canada, R0G 1P0

[21] Appl. No.: 842,324

[22] Filed: Feb. 28, 1992

[51] Int. Cl.⁵ ............................................. A01D 39/00
[52] U.S. Cl. ......................................... 56/341; 100/88
[58] Field of Search ..................... 56/341, 342; 100/88, 100/89

[56] References Cited

U.S. PATENT DOCUMENTS

| | | | |
|---|---|---|---|
| 4,065,914 | 1/1978 | Phillips et al. | 56/341 |
| 4,433,533 | 2/1984 | Giani | 56/341 |
| 4,702,066 | 10/1987 | Newendorp et al. | 100/88 X |

Primary Examiner—Terry Lee Melius
Attorney, Agent, or Firm—Adrian D. Battison; Stanley G. Ade; Murray E. Thrift

[57] ABSTRACT

A baler of the type for forming cylindrical bales is improved by the use of a combine type pickup which more effectively lifts the crop from the ground for insertion into the main baler housing. Between a feeder housing of the combine type pickup and the main baler housing is provided a transportation section under which is provided a belt to ensure that any material falling from the transportation section is caught by the belt and carried rearwardly for collection in an auger and fan assembly. The auger and fan assembly provides a low pressure within the baler housing which is substantially fully enclosed so that all material is kept within the baler and prevented from escaping. The collected material in the fan is carried through a duct to a discharge cyclone dropping the material back into the transportation section for carrying into the baler housing for baling. The frame of the baler is mounted upon steerable wheels which allow the pickup to be arranged at an angle to the swath and allow the pickup to be steered across the swath to ensure that it properly follows the swath while the tractor continues in a straight line.

17 Claims, 2 Drawing Sheets

BALER FOR FORMING CYLINDRICAL BALES

BACKGROUND OF THE INVENTION

The present invention relates to a baler for forming cylindrical bales.

Many different designs of baler are currently available of the type for forming what are known as "big round bales" which are cylindrical having generally a diameter of the order of 4 to 6 feet and an axial length lying also in the range 4 to 6 feet. Bales of this type are generally used for forage crops and hence less attention has been given to losses of leaves, grain and chaff from the material since this is considered generally to be of less importance in forage type crops. However the amount of losses from a conventional baler are significantly high and under current economic conditions it is becoming more important to ensure that all crop materials are properly collected and baled.

The conventional baler includes simply a roller type pickup which is positioned immediately forwardly of the main baler housing and of a width substantially equal to the width of the main baler housing. The crop is therefore simply lifted from a windrow from the ground into the main baler housing where it is acted upon either by belts or by rollers to rotate the crop material about an axis transverse to the direction of movement so as to roll the crop material into the cylindrical shape bale.

The simple roller type pickup is very inefficient and has a significant loss in that much of the material is not properly picked up but left merely in the ground. Furthermore the action of the various belts and rollers upon the crop material tends to beat it vigorously which breaks away grain, leaves and chaff all of which are valuable but these simply fall through the openings between the belts and/or rollers and fall from the baler back to the ground.

Conventionally two type of balers are available of this sort. In the first type the bale is rotated by a belt arrangement which collapses to the diameter of the initial roll of material as it is rotated about the axis and then expands as the bale increases in diameter. This arrangement forms more solid bales that have constant density throughout the radius of the bale and thus are of maximum density for transportation. Another type of baler includes simply rollers at the periphery of the cylindrical chamber so that the material is rotated from the outside and this arrangement forms what are known as "soft-centre" bales. In both cases, however there are significant losses either between the belt sections or between the rollers.

SUMMARY OF THE INVENTION

It is one object of the present invention, therefore, to provide an improved baler of the type for forming cylindrical bales which may reduce losses of crop material during the pickup and baling process.

According to the first aspect of the invention there is provided a baler for forming cylindrical bales from crop material picked up from the field comprising a frame, ground wheels mounted on the frame for transportation of the frame across the ground in a working direction, a pickup mounted on the frame for picking up crop from the ground for baling, a main baler housing having a feed opening into which the picked up material is introduced and drive means mounted within the main baler housing for driving the material to rotate about an axis to form a bale which is cylindrical about said axis, means for releasing a formed bale from the baler housing, the housing being substantially closed except for said feed opening and there being provided fan means for drawing air from the housing such that air is drawn into the housing from any opening therein so as to tend to retain crop material within the housing and means for transporting crop material drawn into the fan means for return to the crop for baling in said main baler housing.

According to the second aspect of the invention, there is provided baler for forming cylindrical bales from crop material picked up from the field comprising a frame, ground wheels mounted on the frame for transportation of the frame across the ground in a working direction, a pickup mounted on the frame for picking up crop from the ground for baling, a main baler housing having a feed opening into which the picked up material is introduced and drive means mounted within the main baler housing for driving the material to rotate about an axis to form a bale which is cylindrical about said axis, means for releasing a formed bale from the baler housing, including bottom transporting means onto which crop material from the pickup is fed for transportation rearwardly into the main baler housing, and crop collection means mounted under the bottom transportation means for collecting any crop material falling through the bottom transportation means for collection of said fallen crop material for return to the crop for baling, wherein the crop collection means comprises a belt extending underneath the bottom transportation means and running from the pickup rearwardly toward the baler housing.

According to the third aspect of the invention, there is provided a baler for forming cylindrical bales from crop material picked up from the field comprising a frame, ground wheels mounted on the frame for transportation of the frame across the ground in a working direction, pickup mounted on the frame for picking up crop from the ground for baling, a main baler housing having a feed opening into which the picked up material is introduced and drive means mounted within the main baler housing for driving the material to rotate about an axis to form a bale which is cylindrical about said axis, means for releasing a formed bale from the baler housing, wherein the frame has a main longitudinal axis with said pickup arranged at right angles to the axis and wherein the ground wheels are arranged at an angle to the main longitudinal axis such that the main longitudinal axis is arranged at an angle to the direction of motion, wherein the wheels are steerable and wherein there is provided a hitch member extending from the frame to a tractor vehicle such that the wheels are steerable under control for an operator on the tractor so as to move said pickup in a direction transversely of the tractor to steer the pickup relative to the crop.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
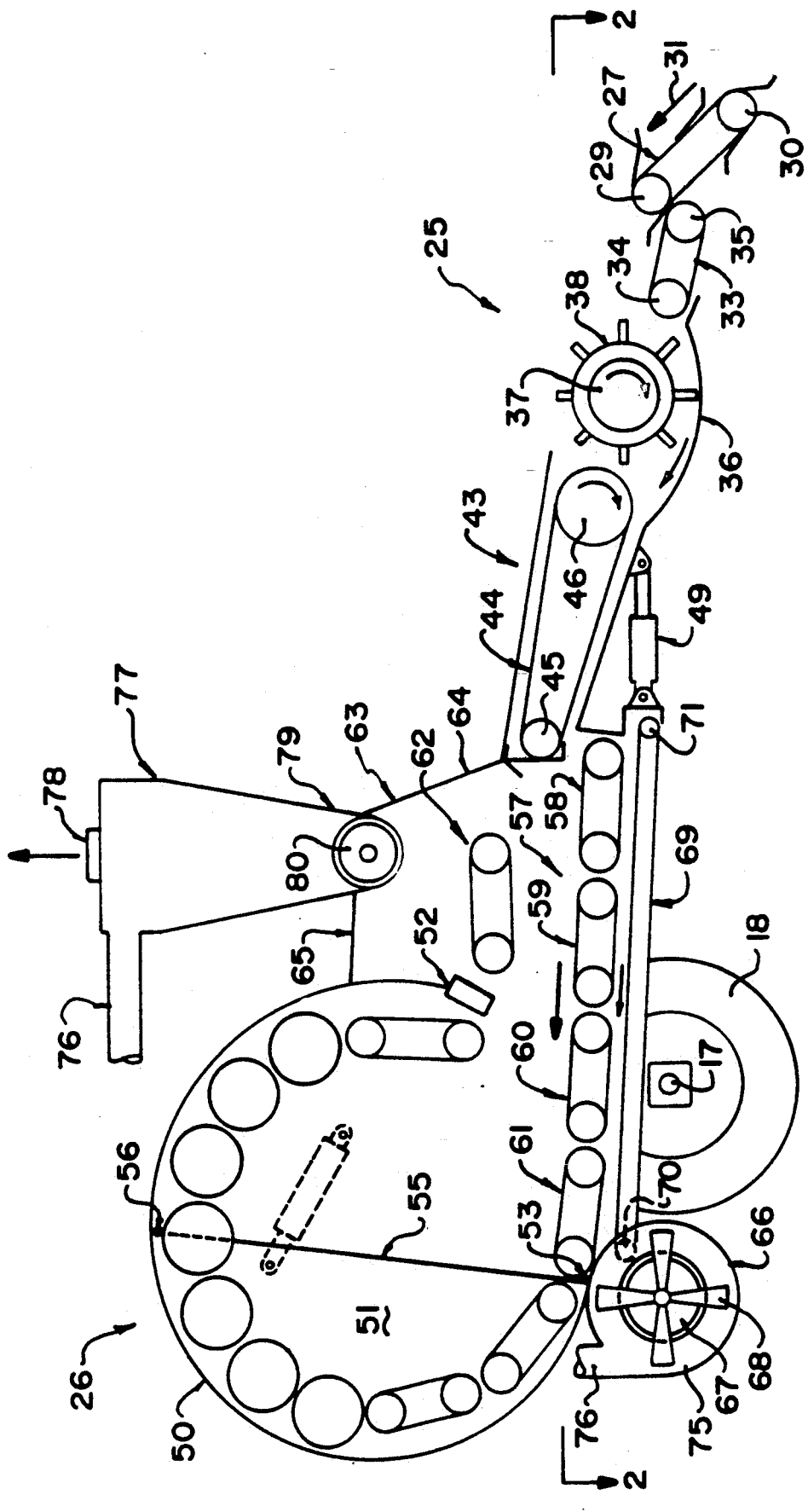
FIG. 1 is a schematic side elevational view of a baler according to the present invention.

The baler comprises a frame generally indicated at 10 having a main longitudinal axis 11 and a hitch 12 coupled to one side of the main frame 10. The hitch 12 includes a hitch beam 13 extending forwardly and outwardly from the side of the main frame at an angle to the longitudinal axis 11. The hitch beam 13 includes a hitch coupling 14 at a forward end thereof together with a power take off unit 15 for communicating drive from a tractor vehicle (not shown) to a gear box 16 which acts to drive the various components of the baler. The frame includes a main transverse axle 17 on which are mounted groundwheels 18 and 19. The ground wheels are mounted on stub axles 20 connected by king pins 21 to the main axle 17 to allow steering movement of each of the ground wheels relative to the axle 17 and thus relative to the main frame. The steering is actuated by a steering linkage generally indicated at 22. The linkage is actuated by a steering actuator 23 controlled by a hydraulic system on the main tractor unit.

Figure 2:
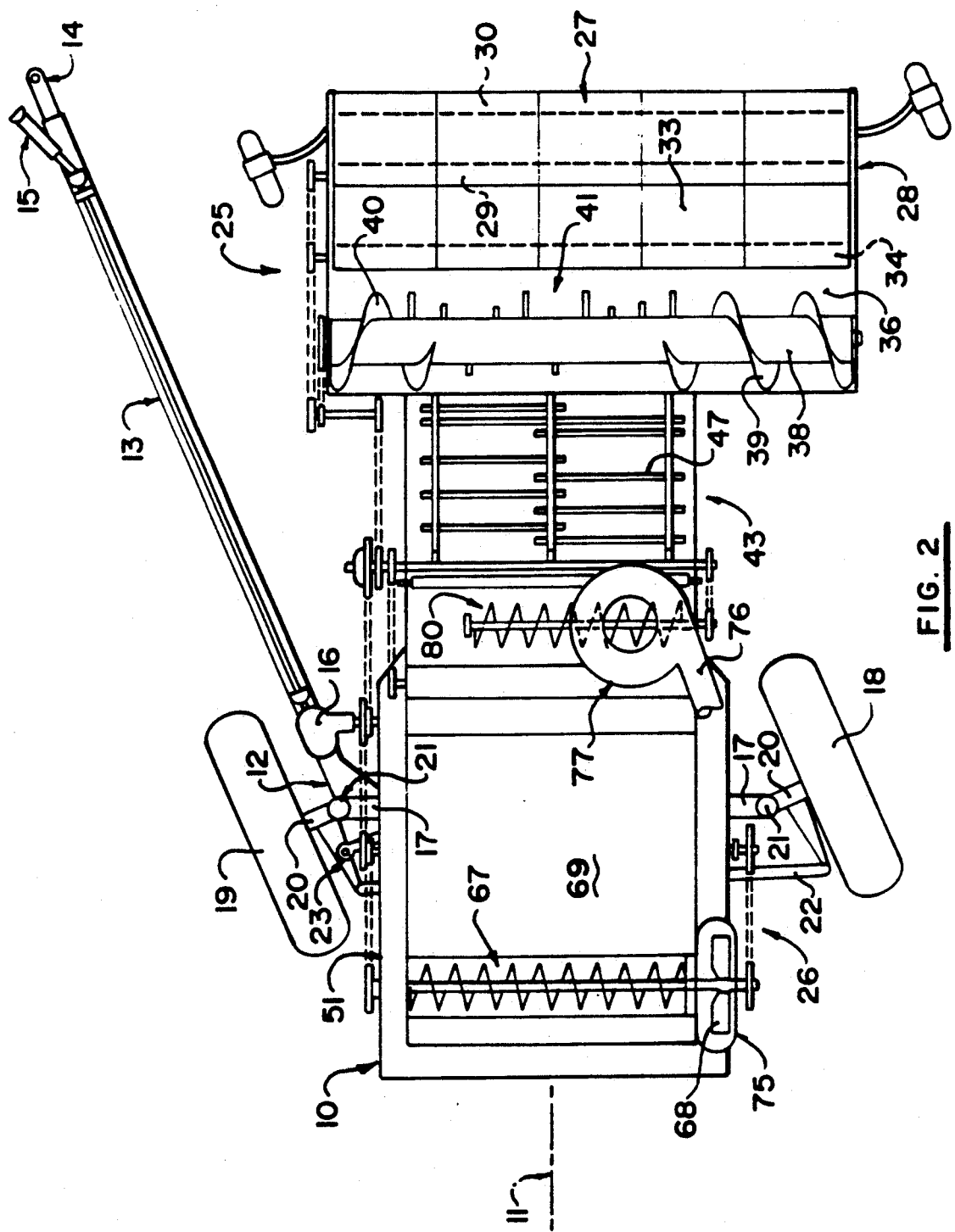
FIG. 2 is a view along the lines 2—2 of FIG. 1.

In a position shown in FIG. 2, the ground wheels 18 and 19 lie directly longitudinally of the hitch beam 13 so that the frame will follow directly behind the hitch beam and thus directly behind the tractor unit. However a steering action relative to this normal position can be obtained so that the frame will move from side to side relative to the tractor unit to vary the angle of the hitch relative to the frame and relative to the tractor unit.

The main frame 10 carries the pickup and baling parts of the baler with a pickup generally indicated at 25 and the baling section generally indicated at 26.

The pickup 25 is of a type more normally found upon a combine harvester in that it includes a draper type pickup system having a plurality of tooth belts 27 mounted upon a pickup frame 28. The frame 28 carries a pair of rollers 29 and 30 on which the belts are mounted and which rotate about respective axis at right angles to the longitudinal axis 11. The belts carry pickup teeth which project outwardly from the belt so that as the belt rotates in the direction indicated by the arrow 31, the crop material is lifted from the ground onto the upper surface of the belt and over the rollers 29 and 30. The width of this belt type pickup system is significantly greater than that of the baler itself so that the pickup can accomodate the relatively wide windrows which are becoming more widespread as the width of the windrower increases.

Rearwardly of the belt system 27 is provided a conveyor draper 33 including a belt and drive rollers 34 and 35 so that the crop is dropped onto the draper system 33 and carried thereby rearwardly. Immediately rearwardly of the roller 34 is provided a table 36 which has a concavely curved upper surface onto which the crop material is deposited. On top of the table 36 is provided an auger generally indicated at 37. The auger is of a conventional construction includes a main drive cylinder 38, auger flight sections 39 and 40 and a central finger section generally indicated at 41. The auger flights are arranged to transport the material from the table in a direction transverse to the longitudinal axis 11 so as to draw the material toward the finger section 41. The finger section includes a plurality of fingers projecting outwardly from the drum 38 acting to transport the material across the table 36 rearwardly toward a feeder housing generally indicated at 43. The feeder housing again is of conventional construction of the type generally used on a combine harvester. The feeder housing 43 includes a feeder chain 44 mounted within the feeder housing on rollers 45 and 46. The feeder housing has a rectangular front mouth and is rectangular in cross section gradually tapering toward a rear end at the roller 45. The feeder chain includes a plurality of slats 47 which extend acorss the width of the feeder housing and act to transport the material underneath the lower run of the feeder chain along the lower surface of the feeder housing toward the baler 26.

The pickup thus is of a relatively conventional type used on combines but not generally used on a baler. The pickup including the feeder housing are mounted on the baler frame for pivotal movement substantially about the axis of the roller 45 actuated by a cylinder 49 to raise and lower the pickup as required.

The main baler section includes a baler housing 50 which is generally cylindrical in shape having a peripheral wall of circular cross section and two end walls one of which is shown at 51 in FIG. 1. The main baler housing is of a closed construction so that it includes a sheet fully surrounding the peripheral wall and flat sheets closing the end walls so that effectively there are no spaces in the baler housing from a front edge 52 of the peripheral wall to a rear edge 53 of the peripheral wall. The baler housing is split as indicated at 55 allowing pivotal movement about a pivot axis 56 of a rear portion of the baler housing allowing the baler housing to open and to deposit a completed bale simply by dumping it out of the rear. The baler housing thus opens and closes in a clam shell type arrangement which is a conventional technique.

The baler housing thus defines an inlet opening between the edges 52 and 53 of the otherwise closed peripheral wall.

The rear mouth of the feeder housing discharges onto a bottom transportation system 57 transporting the material from the rear of the pickup into the main baler housing. The bottom transportation system comprises a plurality of belt sections 58, 59, 60 and 61 each of which is defined by a pair of rollers and draper mounted on the rollers for driving movement of the upper run of the draper in a direction to move the material rearwardly from the feeder housing into the bottom of the baler housing. The bottom tranportation system thus has a plurality of openings between each belt section 58, 59, 60, 61 and the next. The transportation system of the crop material further includes a top transportation system generally indicated at 62 which includes a further belt section defined by rollers and a draper. Of course each of the drapers has a width equal to the width of the baler housing and equal to the width of the rear end of the feeder housing so that the material is properly transported thereby into the baler housing. The top transportation system 62 is covered by a housing 63 which includes a pair of panels 64 and 65. The panel 64 extends upwardly from the rear of the feeder housing and the panel 65 extends forwardly from a front part of the main baler housing to intersect at a position just forwardly of the front roller of the top transportation system 62.

At the rear edge 53 of the peripheral wall is provided a cylindrical housing 66 depending rearwardly from the main baler housing and having an axis parallel to the axis of the main baler housing. Within the cylindrical housing is mounted an auger 67 on one end of which is mounted a fan 68 both of which are commonly rotatable about the axis of the housing 66. Forwardly of the cylindrical housing and opening into the cylindrical housing is provided a belt 69 mounted upon a rear roller 70 and a front roller 71 and defining a full bottom sheet for the baler. Thus an upper run of the belt 69 has a width equal to the width of the baler housing and a length so as to extend from the rear end of the feeder housing right back to the cylindrical housing 66. The belt 69 thus effectively closes off the lower part of the baler. The belt is rotated in a direction so that the upper run moves rearwardly from a position adjacent the feeder housing back to the cylindrical housing 66.

The fan 68 rotates in a chamber 75 which has an outlet duct 76 extending tangentially therefrom. The outlet duct extends from the chamber 75 to a discharge element 77. The discharge element 77 comprises substantially a cyclone which allows the air transporting the material through the duct 76 to escape upwardly through an opening 78 in the cyclone while the heavier material falls downwardly in the cyclone to drop to the bottom of the cyclone as indicated at 79 onto an auger 80 extending across the transportation of the baler at a position just above the upper transportation member 62. Thus material collected in the fan 68 is transported through the duct 76 to the discharge element 77 and is then spread across the width of the transportation section onto and just behind the upper transportation member 62 so as to drop back onto the crop as it passes under the transportation member 62 on top of the bottom transportation section.

Thus any material which escapes into the auger and found section either carried on top of the belt 69 or escaping through the open inlet part of the baler housing is carried back to and reinserted into the crop for proper baling.

The device as described above provides therefore the following advantages:

1) Totally enclosed bale chamber—All the usual loss of leaves, grain or chagg, common to all existing balers has been eliminated as the total baler is enclosed. A metal shield covers the top and sides. The under side is enclosed by a rubberized draper. This draper delivers the retrieved leaves, grain and chaff to a cross auger and fan. This fan creates a vacuum within the entire balers so that all loose material is captured and returned to re-enter the baler with the incoming forage.

2) Much Improved Pickup—Pickup is a draper type as used on cereal grain combines. The width of the pickup is 10 feet to accomodate todays larger windrows and to better gather windrows when scattered by the wind. The pickup is also free floating. The height of the pickup is self determined by guide wheels on the pickup, to eliminate the pickup from skipping over any of the forage. This type of pickup will greatly reduce the shattering of leaves or grain as experienced by drum type pickups of previous balers.

3) Angled Pickup—to also improve the gathering ability of the pickup. As the teeth of the pickup pass under the lower roller, each tooth sweeps a 3 or 4 inch path, lifting the forage by a side approach. No hay or grain will remain after this pickup has passed over. Even windrows which have suffered weeks of wet weather will be lifted cleanly. Also the angle feature reduces the incidence of stones or sticks, as they are kicked aside by the angle on the teeth.

4) Increased capacity—The through put capacity of the baler is increased. Because the forage is partly compressed by the action of the feeder chain before the forage enters the bale chamber, thus reducing a constriction as found on other balers.

5) Smoother running and no side draft—As seen from the drawing, the baler is positioned almost directly behind the tractor which eliminates side draft in hills or soft ground. Also the drive shaft will be seen to be in a straight line (180 degrees) thus eliminating angles on the drive shaft, and there will be no need for a constant velocity drive shaft.

6) Side mounted pickup—This baler is designed with the pickup off to the right side similar to a pull type combine. The previous balers all have the disagreeable feature of staddling the windrow with much of the forage being damaged by tramping from the tractor wheels. Also a frequent problem with centre feed balers was a plugging of the feeder. If the windrow was heavy, the forage would catch under the tractor draw bar and roll into a lump resulting in the baler being plugged, and resulting in down time to clear out the machine. The side mounted principle also permits the operator to zig-zag his steering without running the tractor wheels on the windrow.

7) Better shaped bales—This baler is also equipped with Variable Angle steering on the wheels of the baler. A hydraulic circuit from the tractor is used to steer the baler on the go by using the hydraulic control, the operator may steer the baler from right to left to crowd the ends of the bale with forage to form neat, solid, well formed bales that endure loading and handling.

8) Less operator fatigue—With the pickup mounted on the side, the operator will find himself spending most of his time looking sideways at the pickup which is much easier on the operator than previously looking rearward. Also the operator is better able to judge the volume of forage feeding into the baler and to regulate the tractor speed so as to always keep the baler working to full capacity. Balers make better shaped bales when they are kept to full capacity.

Many serious accidents occur in the unplugging of conventional balers, and with this type of pick-up and feeder as used on combines, the incidence of plug ups and accidents will be reduced, and safety much improved.

Because of the delays inherent in the feeding system into the baler chamber, no backing up is necessary to discharge the bale. This system should require only stopping to kick out the bale, then starting forward in the usual way. The baler will be closed by the time new incoming forage will arrive at the bale chamber.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A baler for forming cylindrical bales from crop material picked up from the field comprising a frame, ground wheels mounted on the frame for transportation of the frame across the ground in a working direction, a pickup mounted on the frame for picking up crop from the ground and forming a crop flow for baling, a main baler housing having a feed opening into which the picked up material is introduced and drive means mounted within the main baler housing for driving the material to rotate about an axis to form a bale which is cylindrical about said axis, means for releasing a formed bale from the baler housing, the housing being substantially closed except for said feed opening, fan means for drawing air from the housing such that air is drawn into the housing from at least one opening therein so as to tend to retain crop material within the housing and means for transporting crop material drawn by the fan means for return to the crop flow for baling in said main baler housing.

2. The baler according to claim 1 including bottom transporting means onto which crop material from the pickup is fed for transportation rearwardly into the main baler housing, and crop collection means mounted under the bottom transportation means for collecting any crop material falling through the bottom transportation means for collection of said fallen crop material for return to the crop flow for baling.

3. The baler according to claim 2 wherein the crop collection means comprises a belt extending underneath the bottom transportation means and running from the pickup rearwardly toward the baler housing.

4. The baler according to claim 2 wherein the crop collecting means transports the fallen crop material to the fan means.

5. The baler according to claim 1 wherein the transportation means includes a duct through which the crop material is transported by air movement and means for extracting the crop material from the air for deposit onto the crop material for feeding into the main baler housing.

6. The baler according to claim 5 including bottom transportation means for moving the crop material from the pickup into the main baler housing, said transportation means being arranged to drop the crop material onto the bottom transportation means.

7. The baler according to claim 1 wherein the pickup includes a draper type pickup, a confining auger rearwardly of the draper type pickup arranged to move the material transversely of the direction of movement to confine the material into a narrower width than the width of the pickup and a feeder housing into which the material is fed, the feeder housing including a feeder chain for transporting and compressing the material as it is carried from the auger toward the feed opening of the housing.

8. The baler according to claim 7 including bottom transporting means onto which the material is deposited from the feeder housing, the bottom transporting means comprising a plurality of separate transporting elements having surfaces movable in a direction from the feeder toward the main baler housing.

9. The baler according to claim 1 wherein the frame has a main longitudinal axis with said pickup arranged at right angles to the axis and wherein the ground wheels are arranged at an angle to the main longitudinal axis such that the main longitudinal axis is arranged at an angle to the direction of motion.

10. The baler according to claim 9 wherein the wheels are steerable and wherein there is provided a hitch member extending from the frame to a tractor vehicle such that the wheels are steerable under control of an operator on the tractor so as to move said pickup in a direction transversely of the tractor to steer the pickup relative to the crop.

11. A baler for forming cylindrical bales from crop material picked up from the field comprising a frame, ground wheels mounted on the frame for transportation of the frame across the ground in a working direction, a pickup mounted on the frame for picking up crop from the ground and forming a crop flow for baling, a main baler housing having a feed opening into which the picked up material is introduced and drive means mounted within the main baler housing for driving the material to rotate about an axis to form a bale which is cylindrical about said axis, means for releasing a formed bale from the baler housing, bottom transporting means onto which crop material from the pickup is fed for transportation rearwardly into the main baler housing, and crop collection means mounted under the bottom transportation means for collecting any crop material falling through the bottom transportation means for collection of said fallen crop material for return to the crop flow for baling, wherein the crop collection means comprises a belt extending underneath the bottom transportation means and running from the pickup rearwardly toward the baler housing.

12. The baler according to claim 11 including fan means for drawing air from the housing such that air is drawn into the housing from at least one opening therein so as to tend to retain crop material within the housing wherein the crop collecting means transports the fallen crop material to the fan means.

13. The baler according to claim 11 wherein the transportation means includes a duct through which the crop material is transported by air movement and means for extracting the crop material from the air for deposit onto the crop material for feeding into the main baler housing.

14. The baler according to claim 11 wherein said transportation means is arranged to drop the crop material onto the bottom transportation means.

15. The baler according to claim 11 wherein the pickup includes a draper type pickup, a confining auger rearwardly of the draper type pickup arranged to move the material transversely of the direction of movement to confine the material into a narrower width than the width of the pickup and a feeder housing into which the material is fed, the feeder housing including a feeder chain for transporting and compressing the material as it is carried from the auger toward the feed opening of the housing.

16. The baler according to claim 11 wherein the frame has a main longitudinal axis with said pickup arranged at right angles to the axis and wherein the ground wheels are arranged at an angle to the main longitudinal axis such that the main longitudinal axis is arranged at an angle to the direction of motion.

17. The baler according to claim 16 wherein the wheels are steerable and wherein there is provided a hitch member extending from the frame to a tractor vehicle such that the wheels are steerable under control of an operator on the tractor so as to move said pickup in a direction transversely of the tractor to steer the pickup relative to the crop.

* * * * *